(12) United States Patent
Jangili

(10) Patent No.: US 7,493,769 B2
(45) Date of Patent: Feb. 24, 2009

(54) ASSEMBLY AND METHOD FOR COOLING REAR BEARING AND EXHAUST FRAME OF GAS TURBINE

(75) Inventor: Ranjit Kumar Jangili, Greenville, SC (US)

(73) Assignee: General Electric Company, Schenectady, NY (US)

( * ) Notice: Subject to any disclaimer, the term of this patent is extended or adjusted under 35 U.S.C. 154(b) by 591 days.

(21) Appl. No.: 11/257,153

(22) Filed: Oct. 25, 2005

(65) Prior Publication Data

US 2007/0089421 A1    Apr. 26, 2007

(51) Int. Cl.
*F02C 1/00*    (2006.01)
(52) U.S. Cl. .......................................... 60/772; 415/180
(58) Field of Classification Search .................. 60/772; 415/180, 111, 112
See application file for complete search history.

(56) References Cited

U.S. PATENT DOCUMENTS

| | | | |
|---|---|---|---|
| 2,296,701 A * | 9/1942 | Butler et al. | 415/175 |
| 2,709,567 A * | 5/1955 | Wood | 415/115 |
| 5,161,369 A | 11/1992 | Williams | |
| 6,161,768 A | 12/2000 | Gordon et al. | |
| 6,379,108 B1 | 4/2002 | Schmidt | |
| 6,450,758 B1 | 9/2002 | Schmidt | |
| 6,926,490 B2 * | 8/2005 | McAuliffe et al. | 415/1 |

* cited by examiner

*Primary Examiner*—Michael Cuff
*Assistant Examiner*—Andrew Nguyen
(74) *Attorney, Agent, or Firm*—Nixon & Vanderhye PC

(57) ABSTRACT

A propeller is mounted aft of the rear rotor supporting bearing of a gas turbine. The propeller is driven either by the rotor shaft or by the exhaust gases flowing through the exhaust frame of the turbine. The rotating propeller blows cooling air on the rear bearing. The cooling air can then be circulated through the exhaust frame to cool the exhaust frame as well.

18 Claims, 6 Drawing Sheets

ASSEMBLY AND METHOD FOR COOLING REAR BEARING AND EXHAUST FRAME OF GAS TURBINE

BACKGROUND OF THE INVENTION

The present invention relates to gas turbines for power generation and, more particularly, to a method and assembly for cooling the rear bearing and exhaust frame of a gas turbine.

The gas turbine exhaust frame is conventionally cooled by circulating ambient air through the exhaust frame using external blowers. The gas turbine rear end bearing which supports the rotor shaft's static, dynamic, and thermal loads also needs to be cooled. Conventionally, the rear end bearing is cooled by blowing air using external blowers and either by a separate oil circuit or by the same oil circuit used to lubricate and lift the rotor shaft during start up.

BRIEF DESCRIPTION OF THE INVENTION

Uniform cooling is desirable to avoid non-uniform thermal stress and strain.

The invention proposes to cool the gas turbine rear bearing and the gas turbine exhaust frame with a propeller driven either by the rotor shaft or by the exhaust gases. The rotating propeller blows air on the rear bearing and the air can then be circulated through the exhaust frame to cool the exhaust frame as well. This eliminates the need for external blowers for cooling the exhaust frame.

Thus, the invention may be embodied in a gas turbine having a rotor, a rear bearing rotatably supporting said rotor and an exhaust frame disposed in surrounding relation to said bearing and defining an exhaust gas path therethrough, and a fan assembly disposed axially aft of said bearing and driven by at least one of said rotor and exhaust gas flowing through said exhaust gas path, said fan assembly comprising a propeller including at least two blades configured to direct air axially towards said bearing.

The invention may also be embodied in a method of cooling the rear bearing supporting the rotor and the surrounding exhaust frame of a gas turbine, comprising: mounting a fan assembly axially aft of said bearing so as to be rotatably driven by at least one of said rotor and exhaust gas flowing through an exhaust gas path defined by said exhaust frame, said fan assembly comprising a propeller including at least two blades configured to direct air axially towards said bearing.

DETAILED DESCRIPTION OF THE INVENTION

The invention proposes to cool the gas turbine rear bearing and at least part of the gas turbine exhaust frame using a fan assembly including a propeller either driven by the rotor shaft or by exhaust gases. Thus, the invention utilizes the concept of driving a cooling fan assembly using the rotor shaft's rotational energy or the exhaust gas's kinetic energy. As described in greater detail hereinbelow, the fan assembly may have one propeller (set of blades) or two propellers, depending in particular upon the driving mechanism. The propeller blades draw in ambient air from vents and direct the drawn in cooling ambient air against the rear end bearing area to cool the bearing and the bearing housing. The cooling air flow may then be directed to circulate through the exhaust frame and cool the exhaust frame as well.

Using a fan assembly to cool the rear housing and/or the exhaust frame advantageously eliminates or reduces the requirement for external blowers to cool the gas turbine equipment. The fan assembly also will exhibit quiet operation and thus eliminates noise from the conventional blowers. Consequently, in addition to eliminating skids carrying blowers, acoustic enclosures for blowers, piping and blower operating power consumption are eliminated. The use of fan assemblies is also a lower maintenance assembly than conventional blowers.

As mentioned, a fan assembly as proposed herein may be driven using the rotor shaft's rotational energy or the exhaust gas's kinetic energy. The cooling air circuit may also be varied. FIGS. 1-6 depict as example embodiments of the invention example flow circuits for cooling air into and through the exhaust frame around the rear bearing and also schematically depict example drive configurations and fan assemblies embodying the invention.

Figure 1:
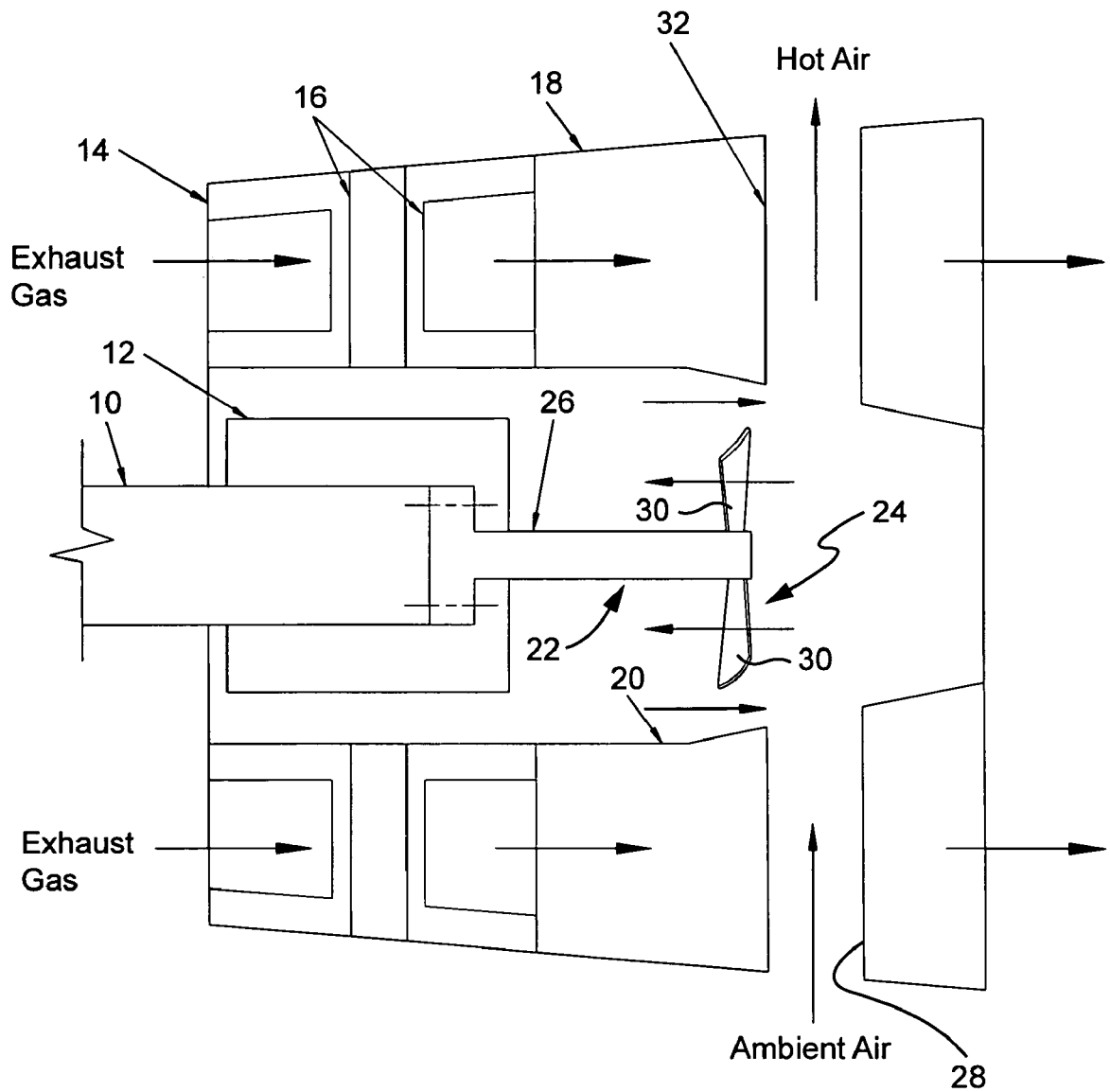
FIG. 1 is a schematic sectional view of a rear bearing cooling assembly including a propeller according to an example embodiment of the invention with cooling air inlets and outlets on an aft side of the propeller.

As illustrated in FIG. 1, the rotor 10 is mounted at the rear end thereof to a bearing and housing schematically shown at 12. An exhaust frame 14 encircles the rear bearing housing and defines a path for exhaust gas flowing out of the gas turbine. The exhaust frame includes support struts 16 and terminates in an exhaust diffuser 18. The exhaust frame has an inner barrel or radially inner periphery 20 surrounding the rear bearing housing 12 and the fan assembly 22 provided in this example embodiment of the invention.

FIG. 1 schematic illustrates fan assembly 22 as comprising a propeller secured via shaft 26 to the rotor 10 to rotate with the rotor and a first example cooling circuit for the rear bearing and bearing housing 12 and the inner periphery 20 of the exhaust frame.

As illustrated, one or more vent paths 28 are defined through the exhaust frame aft of the fan assembly 22 for ambient air to flow in according to a suction force created by the blades 30 of the propeller 24 and one or more paths 32 for spent cooling air to flow out through the exhaust frame. As will be understood, the blades 30 of the fan assembly direct the ambient cooling air towards the rear bearing and bearing housing 12. The cooling air then reverses and flows along the inner periphery 20 of the exhaust frame 14 ultimately to exit through the outflow vent passage(s) 32. It is to be understood that the passages 28,32 may be configured and disposed and may include baffles to encourage the inflow through select passage(s) 28 and out through others 32, the schematic representation of FIG. 1 being provided to underscore that in this example embodiment inflow and outflow passages 28,32 are both provided through the exhaust frame 14, more specifically, through the exhaust diffuser 18 in the illustrated example. In the example of FIG. 1, the propeller 24 that is secured to the aft or rear end of the rotor 10 includes a plurality of blades 30, as schematically represented by two blades. It is to be understood that two, three, or more blades 30 could be provided as deemed necessary or desirable and the configuration and orientation of the blades and respective radial extent may be determined as appropriate to achieve the desired cooling flow towards the bearing housing 12 and exhaust flow away therefrom. In this example embodiment, the fan blade 30 may be truncated to define a path for exhausted air to flow aft therepast.

Figure 2:
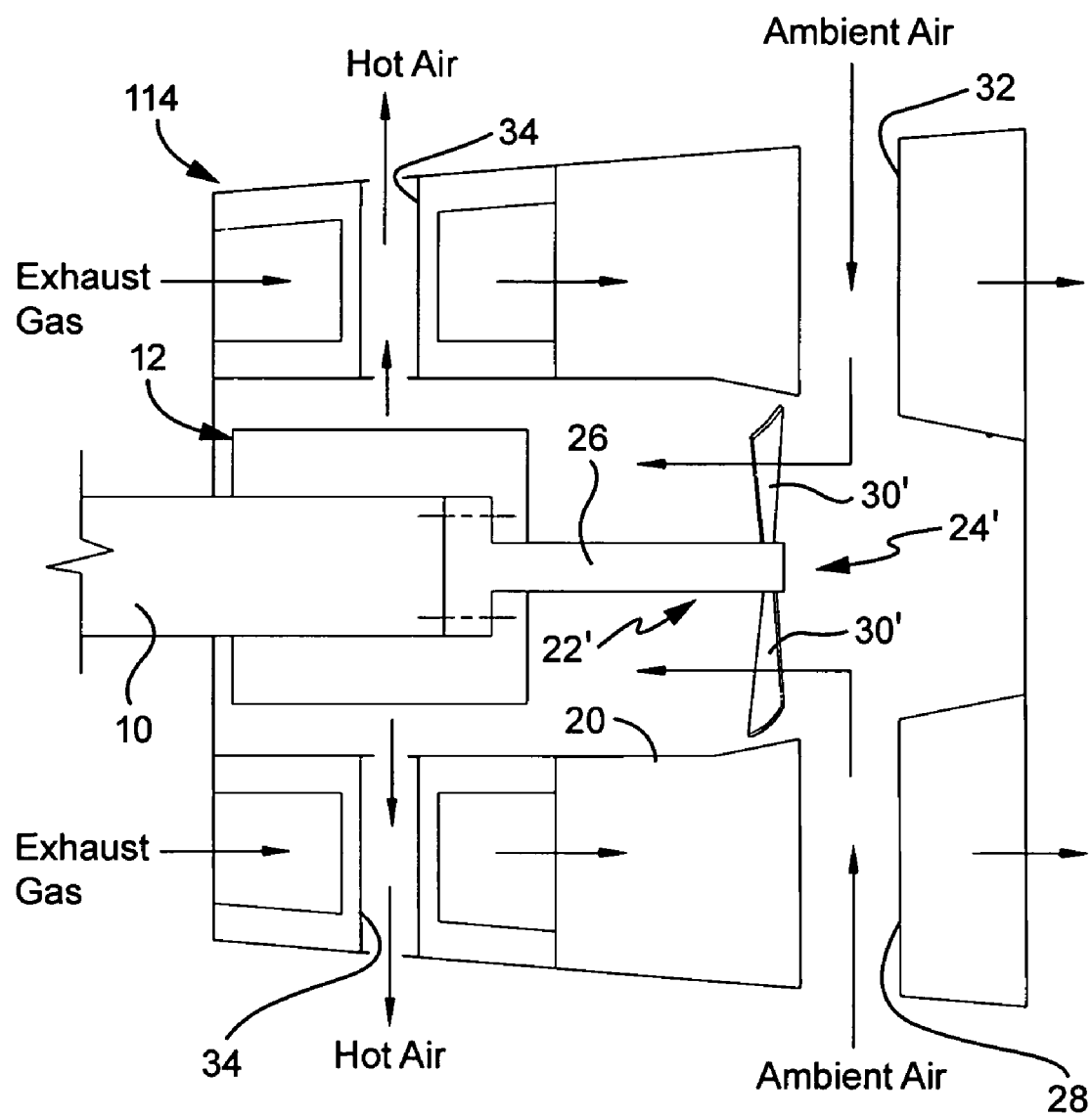
FIG. 2 is a schematic elevational view of another example embodiment of the invention with cooling air inlets on the aft side and cooling air outlets on a forward side of the propeller.

FIG. 2 illustrates an alternate embodiment where the vent passages 28,32 aft of the fan assembly are all configured as inflow passages and hot air outflow passages is defined, e.g., through passages 34 in the exhaust frame. As illustrated, the blades 30' of the propeller 24' of fan assembly 22' may extend into closer proximity to the inner barrel 20 of the exhaust frame 114 because all flow is towards the rear bearing housing 16. The flow of the ambient air convection cools the inner periphery 20 of the exhaust frame 114 as well as the walls surrounding the ducts 34.

Figure 3:
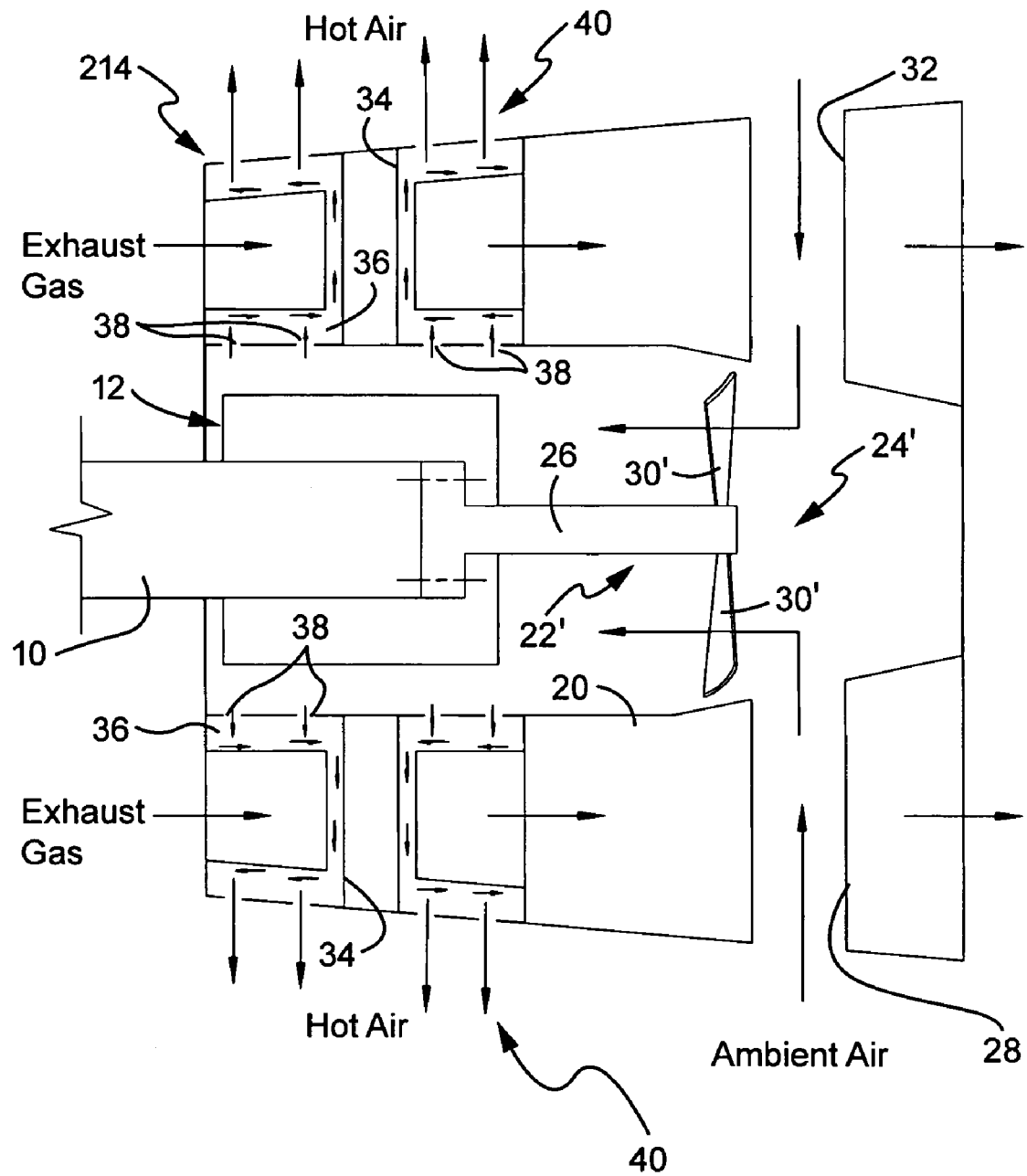
FIG. 3 is a schematic sectional view of a rear bearing and exhaust frame cooling configuration according to another example embodiment of the invention with cooling air inlets on an aft side and venting through the exhaust frame.

FIG. 3 depicts a further alternate example embodiment wherein the inflow and fan configuration substantially corresponds to that depicted in FIG. 2 but the air is circulated through chambers 36 in the exhaust frame rather than through ducts 34. An advantage of air circulating through chambers 36 in the exhaust frame 214 is that the gas openings depicted at 38 generate impingement flow for cooling the walls defining the hot gas path exit flow, to thus provide both impingement and conduction cooling. The spent impingement cooling air ultimately exits the exhaust frame at 40.

Figure 4:
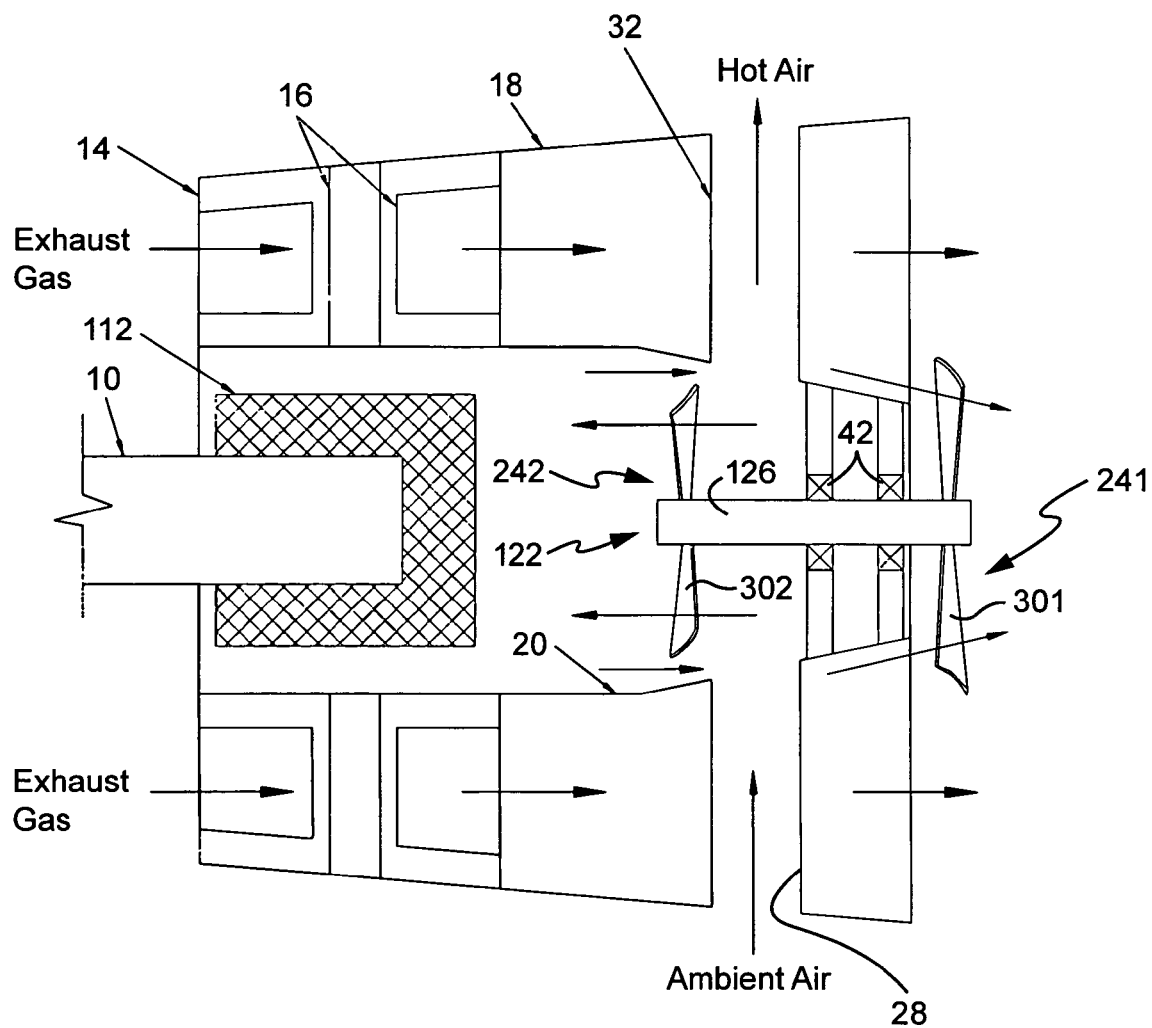
FIG. 4 is a schematic sectional view similar to FIG. 1 depicting an alternate drive assembly for the propeller.

FIG. 4 illustrates an alternate fan assembly according to a further example embodiment of the invention. In this case, the exhaust frame 14 corresponds to that depicted in FIG. 1, so that the same parts are numbered the same. In this example embodiment, however, the fan assembly 122 is driven by the exhaust gas flowing through the exhaust frame 14 rather than by the rotating rotor. Thus, the fan assembly includes first and second propellers 241, 242, each having a respective plurality of fan blades 301, 302. In the illustrated example, the first propeller 241 is disposed at the aft end of a shaft 126 for intercepting at least a part of the exhaust gas flowing along the exhaust gas path through the exhaust frame 14. Interception of the exhaust gas with the first plurality of fan blades causes the shaft 126 to rotate in support bearings 42 provided therefor. The second propeller 242 is mounted to the forward end of the shaft 126 for directing cooling air towards the rear bearing and rear bearing housing 112. The cooling air flow in this embodiment corresponds to that depicted in FIG. 1. Again, the first and second propellers are schematically depicted as having two blades but could include two, three, or more blades as deemed necessary or desirable. As will also be understood, the orientation of the blades 301 is different from blades 302 so that the exhaust gases cause blades 301 to properly rotate shaft 126 for blades 302 to direct cooling air against bearing housing 112.

Figure 5:
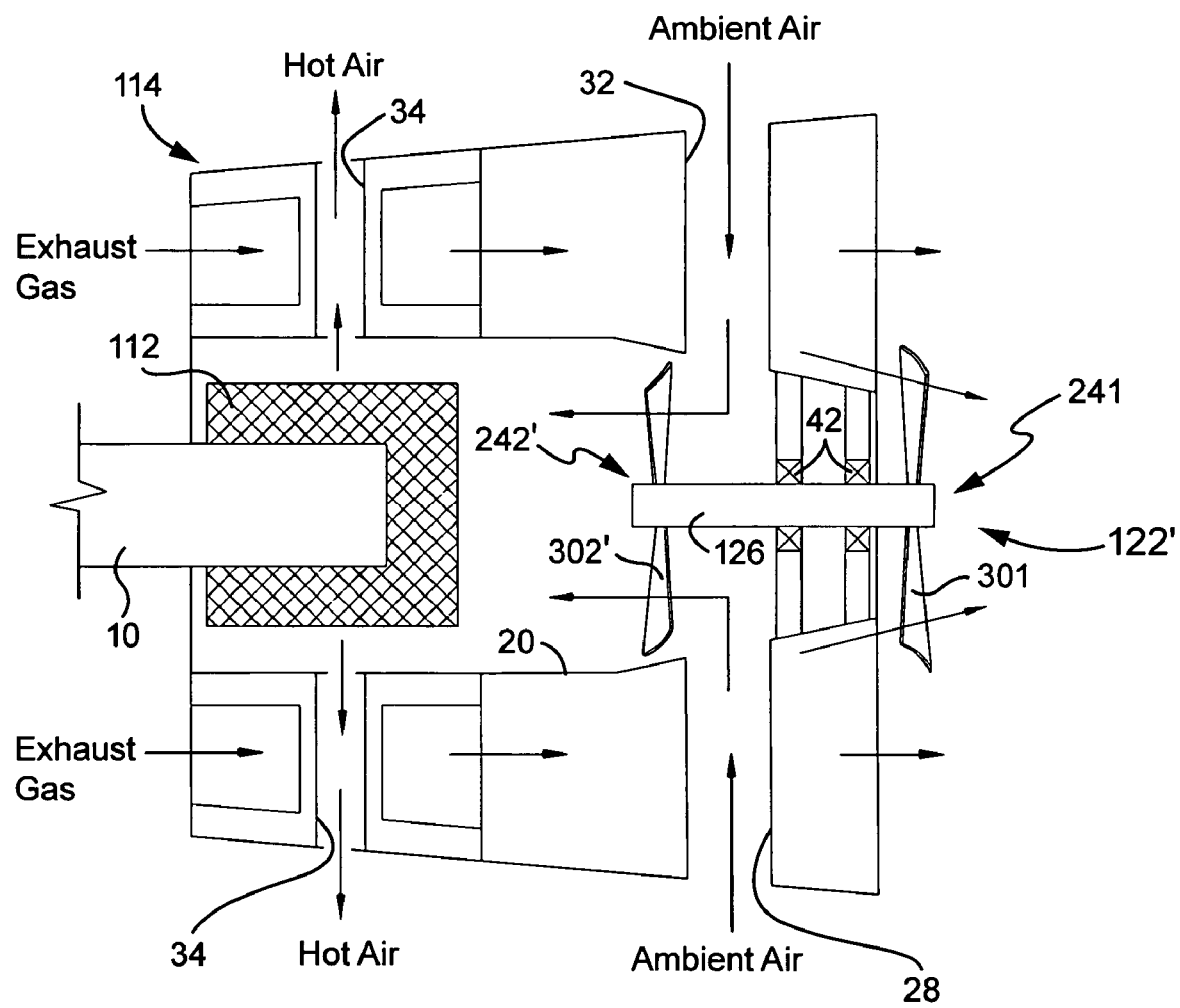
FIG. 5 is a schematic sectional view similar to FIG. 2 depicting an alternate drive assembly for the propeller.
Figure 6:
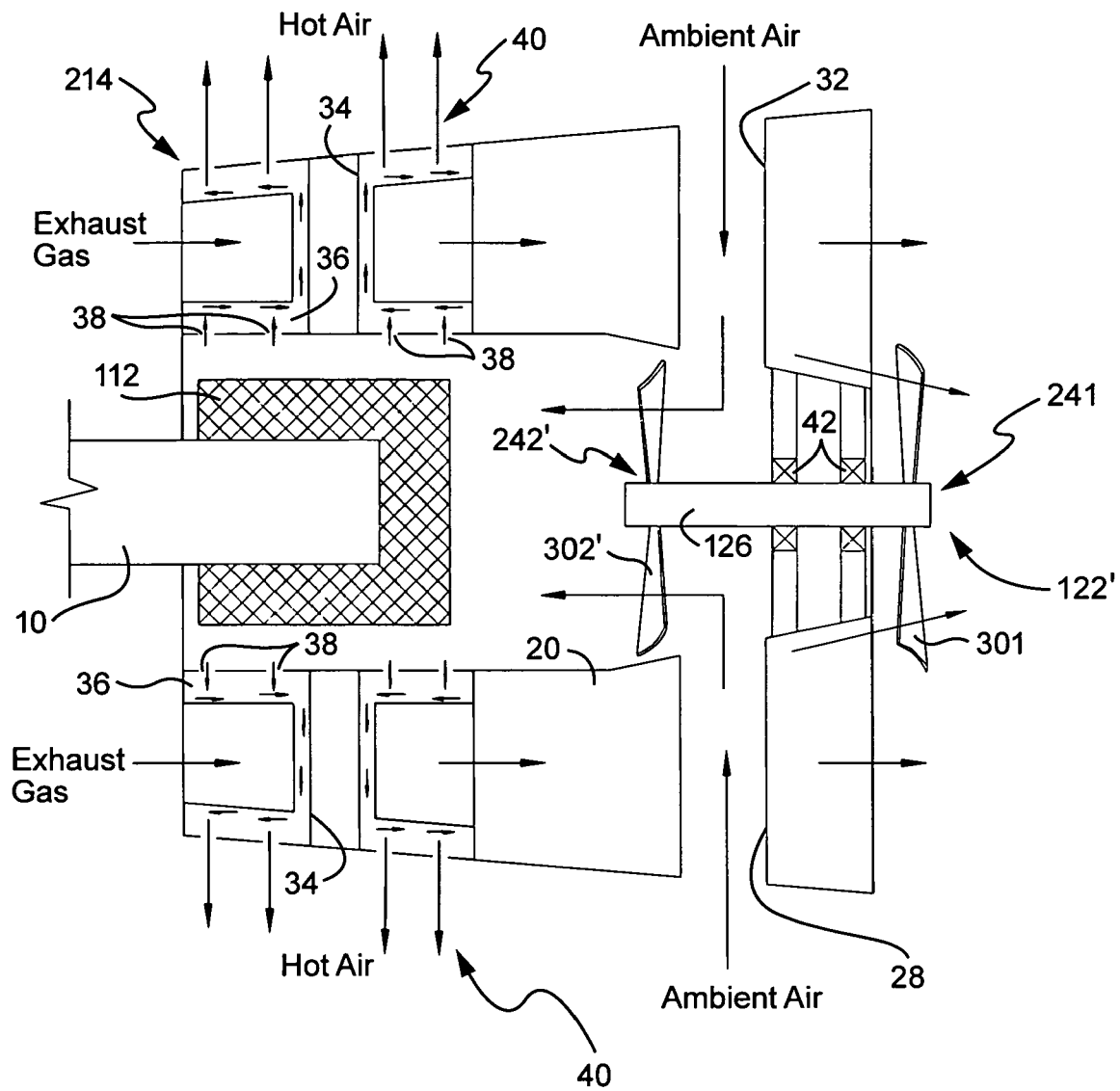
FIG. 6 is a schematic sectional view similar to FIG. 3 depicting an alternate drive assembly for the propeller.

FIGS. 5 and 6 depict cooling paths respectively corresponding to FIGS. 2 and 3 and thus corresponding parts have been numbered in a corresponding manner. The fan assembly 122' is mounted and driven, however, in a manner as disclosed above with respect to FIG. 4, and the parts thereof are correspondingly numbered, although the blades 302' of the second propeller 242' can be longer, as shown, because no path needs to be reserved for exiting hot air.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine having a rotor, a rear bearing rotatably supporting said rotor and an exhaust frame disposed in surrounding relation to said rear bearing and defining therethrough a path for exhaust gas flowing out of the gas turbine, and a fan assembly disposed axially aft of said rear bearing and driven by at least one of said rotor and exhaust gas flowing through said exhaust gas path, said fan assembly comprising a propeller including at least two blades configured to direct air axially at the blade outlets towards said rear bearing;
wherein said exhaust frame defines at least one inlet for ambient air disposed aft of said propeller and wherein said fan assembly is provided with air from said ambient air inlet.

2. A gas turbine as in claim 1, wherein said fan assembly comprises said propeller mounted to a shaft, said shaft being oriented substantially coaxial to said rotor.

3. A gas turbine as in claim 2, wherein said shaft is coupled to said rotor so as to rotate therewith.

4. A gas turbine as in claim 1, wherein said inlet extends radially, substantially perpendicular to the axis of the rotor.

5. A gas turbine as in claim 1, wherein said fan assembly includes first and second propellers, said first propeller being disposed to intercept at least some of the exhaust gas flowing through said exhaust gas path to rotate said first propeller, wherein said first propeller is operatively coupled to said second propeller so that rotation of said first propeller rotates said second propeller, wherein said first and second propellers are mounted to a shaft that is disposed to rotate independently of said rotor, and wherein said second propeller is configured for directing cooling air axially towards said bearing.

6. A gas turbine as in claim 5, wherein said first propeller is disposed axially rearwardly of said second propeller.

7. A gas turbine as in claim 5, wherein said exhaust frame defines at least one inlet for ambient air disposed aft of said second propeller.

8. A gas turbine as in claim 1, wherein a path for cooling air is defined through said exhaust frame, having at least one inlet opening on a radially inner periphery of said exhaust frame for passing air directed thereto by the fan blades.

9. A gas turbine as in claim 1, wherein said exhaust frame includes at least an outlet for cooling air, extending generally radially therethrough.

10. A gas turbine as in claim 9, wherein said outlet is aft of the propeller.

11. A gas turbine as in claim 1, wherein said outlet is forward of the propeller.

12. A method of cooling the rotor supporting rear and surrounding exhaust frame of a gas turbine, comprising: mounting a fan assembly axially aft of said rear bearing so as to be rotatably driven by at least one of said rotor and exhaust gas flowing through a path for exhaust gas flowing out of the gas turbine defined by said exhaust frame in surrounding relation to said rear bearing, said fan assembly comprising a propeller including at least two blades configured to direct air axially at the blade outlets towards said rear bearing;
wherein said exhaust frame defines at least one inlet for ambient air disposed aft of said propeller. and wherein rotation of said propeller draws ambient air through said at least one inlet.

13. A method as in claim 12, wherein said fan assembly comprises said propeller mounted to a shaft oriented substantially coaxial to said rotor, so that said propeller rotates with said shaft.

14. A method as in claim 13, wherein said shaft is coupled to said rotor so as to rotate therewith.

15. A method as in claim 12, wherein said fan assembly includes first and second propellers, said first propeller being disposed to intercept at least some of the exhaust gas flowing through said exhaust gas path to rotate said first propeller, wherein said first propeller is operatively coupled to said second propeller so that rotation of said first propeller rotates said second propeller, wherein first and said second propellers are mounted to a shaft that is disposed to rotate independently of said rotor, and wherein said second propeller is configured for directing cooling air axially towards said bearing.

16. A method as in claim 15, wherein said exhaust frame defines at least one inlet for ambient air disposed aft of said second propeller, and wherein rotation of said propeller draws ambient air through said at least one inlet.

17. A method as in claim 12, wherein a path for cooling air is defined through said exhaust frame, having at least one inlet opening on a radially inner periphery of said exhaust frame for passing air directed thereto by the fan blades.

18. A method as in claim 17, wherein cooling air directed through said at least one inlet opening impingement cools a wall of the exhaust gas path.

\* \* \* \* \*

UNITED STATES PATENT AND TRADEMARK OFFICE
CERTIFICATE OF CORRECTION

PATENT NO. : 7,493,769 B2 Page 1 of 1
APPLICATION NO. : 11/257153
DATED : February 24, 2009
INVENTOR(S) : Jangili It is certified that error appears in the above-identified patent and that said Letters Patent is hereby corrected as shown below:

At column 4 line 55, Claim 12, insert --bearing-- after "supporting rear"

Signed and Sealed this

Twenty-first Day of April, 2009

JOHN DOLL
*Acting Director of the United States Patent and Trademark Office*